(12) United States Patent
Yoo et al.

(10) Patent No.: US 8,326,118 B2
(45) Date of Patent: Dec. 4, 2012

(54) RECORDING MEDIUM STORING A TEXT SUBTITLE STREAM INCLUDING A STYLE SEGMENT AND A PLURALITY OF PRESENTATION SEGMENTS, METHOD AND APPARATUS FOR REPRODUCING A TEXT SUBTITLE STREAM INCLUDING A STYLE SEGMENT AND A PLURALITY OF PRESENTATION SEGMENTS

(75) Inventors: Jea Yong Yoo, Seoul (KR); Si Jung Noh, Ulsan-si (KR); Kang Soo Seo, Anyang-si (KR); Byung Jin Kim, Seongnam-si (KR)

(73) Assignee: LG Electronics, Inc., Seoul (KR)

(*) Notice: Subject to any disclaimer, the term of this patent is extended or adjusted under 35 U.S.C. 154(b) by 1665 days.

(21) Appl. No.: 11/633,028

(22) Filed: Dec. 4, 2006

(65) Prior Publication Data
US 2007/0077031 A1    Apr. 5, 2007

Related U.S. Application Data

(63) Continuation of application No. 11/070,239, filed on Mar. 3, 2005, now Pat. No. 7,809,244.

(30) Foreign Application Priority Data
Mar. 26, 2004  (KR) .................. 10-2004-0020891

(51) Int. Cl.
H04N 5/92    (2006.01)
(52) U.S. Cl. ..................................... 386/244
(58) Field of Classification Search ........... 386/244–246
See application file for complete search history.

(56) References Cited

U.S. PATENT DOCUMENTS

| | | | |
|---|---|---|---|
| 5,294,982 A | 3/1994 | Salomon et al. | |
| 5,627,594 A | 5/1997 | van Gestel | |
| 5,742,352 A * | 4/1998 | Tsukagoshi | 348/468 |
| 5,748,256 A | 5/1998 | Tsukagoshi | |
| 5,848,217 A | 12/1998 | Tsukagoshi et al. | |
| 5,889,564 A | 3/1999 | Tsukagoshi | |
| 5,926,647 A | 7/1999 | Adams et al. | |

(Continued)

FOREIGN PATENT DOCUMENTS

CN    1130786    9/1996

(Continued)

OTHER PUBLICATIONS

European Patent Office Notice of Allowance dated Feb. 4, 2011 issued in corresponding European Application No. 04726671.3.

(Continued)

*Primary Examiner* — David Harvey
(74) *Attorney, Agent, or Firm* — Harness, Dickey & Pierce, P.L.C.

(57) ABSTRACT

A method and apparatus for efficiently reproducing a text subtitle stream, using a dialog style segment defining a set of region styles and at least one dialog presentation segment. Each of the dialog presentation segments contains one or more regions of dialog text that are linked to one of the set of region styles defined in the dialog style segment. The dialog text includes at least one pair of an inline style and a text string. The inline style changes one of the region presentation properties specified by the linked region style for the text string.

6 Claims, 20 Drawing Sheets

U.S. PATENT DOCUMENTS

| | | | |
|---|---|---|---|
| 5,949,752 A | 9/1999 | Glynn et al. | |
| 5,999,225 A | 12/1999 | Yagasaki et al. | |
| 6,046,778 A | 4/2000 | Nonomura et al. | |
| 6,167,410 A | 12/2000 | Imamura | |
| 6,204,883 B1 | 3/2001 | Tsukagoshi | |
| 6,259,858 B1 | 7/2001 | Ando et al. | |
| 6,262,775 B1 | 7/2001 | Kim | |
| 6,288,990 B1 | 9/2001 | Fujiie et al. | |
| 6,345,147 B1 | 2/2002 | Mimura et al. | |
| 6,553,180 B1 | 4/2003 | Kikuchi et al. | |
| 7,072,866 B1 | 7/2006 | Hara | |
| 7,076,728 B2 | 7/2006 | Davis et al. | |
| 7,106,381 B2 | 9/2006 | Molaro et al. | |
| 7,196,806 B2 | 3/2007 | Brown et al. | |
| 7,218,590 B2* | 5/2007 | Han et al. | 369/53.22 |
| 7,236,687 B2 | 6/2007 | Kato et al. | |
| 7,249,318 B1 | 7/2007 | Corell et al. | |
| 7,561,780 B2 | 7/2009 | Seo et al. | |
| 7,593,060 B2 | 9/2009 | Yoo et al. | |
| 8,081,860 B2 | 12/2011 | Yoo et al. | |
| 2001/0030710 A1 | 10/2001 | Werner | |
| 2002/0003941 A1* | 1/2002 | Hatae et al. | 386/46 |
| 2002/0087999 A1 | 7/2002 | Kashima | |
| 2002/0126992 A1* | 9/2002 | Sakuramoto | 386/77 |
| 2002/0135607 A1 | 9/2002 | Kato et al. | |
| 2002/0194618 A1 | 12/2002 | Okada et al. | |
| 2003/0012558 A1 | 1/2003 | Kim et al. | |
| 2003/0039472 A1 | 2/2003 | Kim | |
| 2003/0059303 A1 | 3/2003 | Noussitou et al. | |
| 2003/0099464 A1 | 5/2003 | Oh et al. | |
| 2003/0188312 A1 | 10/2003 | Bae et al. | |
| 2003/0202431 A1 | 10/2003 | Kim et al. | |
| 2003/0235404 A1 | 12/2003 | Seo et al. | |
| 2004/0001699 A1 | 1/2004 | Seo et al. | |
| 2004/0075668 A1 | 4/2004 | Van Der Meer et al. | |
| 2004/0081434 A1* | 4/2004 | Jung et al. | 386/95 |
| 2004/0202454 A1 | 10/2004 | Kim et al. | |
| 2004/0225724 A1 | 11/2004 | Pavlik et al. | |
| 2005/0058435 A1 | 3/2005 | Chung et al. | |
| 2005/0191035 A1 | 9/2005 | Jung et al. | |
| 2005/0196147 A1 | 9/2005 | Seo et al. | |
| 2005/0198053 A1 | 9/2005 | Seo et al. | |
| 2006/0013563 A1* | 1/2006 | Adolph et al. | 386/95 |

FOREIGN PATENT DOCUMENTS

| | | |
|---|---|---|
| CN | 1139273 A | 1/1997 |
| CN | 1140311 | 1/1997 |
| CN | 1214499 | 4/1999 |
| CN | 1264894 | 8/2000 |
| CN | 1348588 | 5/2002 |
| CN | 1417798 | 5/2003 |
| EP | 0 690 335 A1 | 1/1996 |
| EP | 0 700 211 A2 | 3/1996 |
| EP | 0 734 181 A2 | 9/1996 |
| EP | 0 969 444 A1 | 1/2000 |
| EP | 1 173 031 A1 | 1/2002 |
| EP | 1 178 691 A1 | 2/2002 |
| EP | 1 326 451 A1 | 7/2003 |
| EP | 1 400 968 A2 | 3/2004 |
| EP | 1 420 580 A1 | 5/2004 |
| JP | 8241068 | 9/1996 |
| JP | 9102940 | 4/1997 |
| JP | 9-115270 | 5/1997 |
| JP | 10-191222 | 7/1998 |
| JP | 11-232849 | 8/1999 |
| JP | 11-252518 | 9/1999 |
| JP | 11252459 | 9/1999 |
| JP | 2002-027386 | 1/2002 |
| JP | 2002-118821 | 4/2002 |
| JP | 2002-199354 | 7/2002 |
| JP | 2002-374494 | 12/2002 |
| JP | 2003-108866 | 4/2003 |
| JP | 3402533 | 5/2003 |
| JP | 2003-173621 | 6/2003 |
| JP | 2004-194131 | 7/2004 |
| JP | 2007-523437 | 8/2007 |
| JP | 2007-525904 | 9/2007 |
| JP | 2007-309215 | 11/2007 |
| KR | 10-1999-0048985 | 7/1999 |
| KR | 10-0384611 | 5/2003 |
| KR | 2003-0061953 | 7/2003 |
| KR | 10-2004-0034403 | 4/2004 |
| RU | 2129758 | 4/1999 |
| RU | 2006 120 480 | 11/2004 |
| TW | 311320 | 7/1997 |
| TW | 344186 | 11/1998 |
| TW | 354676 | 3/1999 |
| TW | 408284 | 10/2000 |
| TW | 462040 | 11/2001 |
| TW | I238391 | 8/2005 |
| WO | WO 99/38166 * | 7/1999 |
| WO | RU 2000123689 | 6/2000 |
| WO | WO 01/48756 A1 | 7/2001 |
| WO | WO 02/063878 | 8/2002 |
| WO | WO 03/056560 A1 | 7/2003 |
| WO | WO 2004/036574 A1 | 4/2004 |
| WO | WO 2004/047430 * | 6/2004 |
| WO | WO 2004/090885 A1 | 10/2004 |
| WO | WO 2005/031740 A1 | 4/2005 |
| WO | WO 2005/065055 A2 | 7/2005 |
| WO | WO 2005/074400 A2 | 8/2005 |
| WO | WO 2005/076276 A1 | 8/2005 |
| WO | WO 2005/076609 A1 | 8/2005 |
| WO | WO 2005/079171 | 9/2005 |
| WO | WO 2005/083708 A1 | 9/2005 |

OTHER PUBLICATIONS

"HTML 4.01 Specification, Section 9 Text," Dec. 24, 1999, pp. 1-13; retrieved from the Internet URL http://www.w3.org/TR/1999/REC-html401-19991224/struck/text.html (retrieved on Nov. 20, 2010).
Office Action issued Mar. 28, 2008 by the Malaysian Patent Office in counterpart Malaysian Patent Application No. PI 200440992.
Office Action issued May 13, 2008 by the U.S. Patent and Trademark Office in related U.S. Appl. No. 10/957,578.
European Office Action dated Sep. 3, 2010 issued in corresponding European application No. 04 72 6671.3.
Japanese Notice of Allowance dated Sep. 10, 2010 issued in corresponding Japanese application No. 2007-504874 and English translation thereof.
"Digital Video Broadcasting (DVB); Subtitling systems" European Standard (Telecommunications series), Sophia-Antipo, FR, vol. BC, No. V121, Jun. 2002, XP014001876.
Microsoft Corporation: "Understanding SAMI 1.0" Microsoft Developers Network, (Oct. 1, 2001),XP007902747.
Office Action issued Aug. 15, 2008 by the Taiwanese Patent Office in counterpart Taiwanese Patent Application No. 093133427.
Office Action dated Nov. 13, 2009 in realted co-pending U.S. Appl. No. 11/070,239.
English translation of Office Action for counterpart Japanese Patent Application No. 2007-309215 dated Jan. 22, 2010.
Office Action from the USPTO for counterpart U.S. Appl. No. 11/980,438 dated Mar. 5, 2010.
Office Action from the USPTO for counterpart U.S. Appl. No. 10/957,587 dated Feb. 18, 2010.
Korean Notice of Allowance dated Jun. 29, 2011 issued in corresponding Korean Application No. 10-2006-7022274.
U.S. Office Action (U.S. Appl. No. 10/957,587) dated Aug. 3, 2010.
Office Action issued Jul. 18, 2008 by the European Patent Office in counterpart EP Application No. 05 721 894.3-2210.
Office Action issued Sep. 26, 2008 by the Russian Patent Office for counterpart Russian Patent Application No. 2006131586 (with English language translation).
Office Action issued Feb. 26, 2009 by the Russian Patent Office in counterpart Russian Patent Application No. 2006137710/28 (with English language translation).
Office Action from the USPTO for counterpart U.S. Appl. No. 11/070,239 dated Apr. 8, 2010.
"Understanding SAMI 1.0", Microsoft Corporation, Feb. 2003.
Digital Video Broadcasting (DVB); Subtitling Systems.
Chinese Office Action dated Apr. 8, 2011 issued in corresponding Chinese Application No. 200480011769.8.

International Search Report issued Sep. 22, 2005 in corresponding International Patent Application No. PCT/KR2005/000580.
Office Action issued Oct. 29, 2008 by the U.S. Patent and Trademark Office in counterpart U.S. Appl. No. 10/820,009.
U.S. Office Action corresponding to counterpart U.S. Appl. No. 10/957,587 dated Feb. 24, 2009.
European Office Action dated Apr. 8, 2011 issued in corresponding European Application No. 04793461.7.
Chinese Patent Gazette (Application No. 200580009431.3) dated Apr. 14, 2010 (without English language translation).
Search Report issued Sep. 7, 2009 by the European Patent Office in counterpart EP Patent Application No. 04 793 460.9-2223.
Decision on Grant issued Jun. 29, 2009 by the Russian Patent Office in counterpart Russian Patent Application No. 2006137710/28 (with English language translation).
Office Action issued Aug. 19, 2009 by the USPTO in U.S. Appl. No. 10/957,587.
Search Report issued Sep. 30, 2009 by the European Patent Office in counterpart European Patent Application No. 09166832.7.
Chinese Patent Gazette dated Nov. 10, 2010 issued in corresponding Chinese application No. 200480041314.0.
Korean Notice of Allowance dated May 31, 2011, issued in corresponding Korean Application No. 10-2005-7019021.
Office Action issued Dec. 19, 2008 by the Chinese Patent Office in counterpart Chinese Patent Application No. 200480041313.6 (with English language translation).
Japanese Office Action dated Nov. 19, 2010 issued in corresponding Japanese application No. 2006-550924.
Chinese Patent Gazette dated Oct. 6, 2010 issued in corresponding Chinese application No. 200480041313.6.
Korean Office Action dated Nov. 30, 2010 issued in corresponding Korean application No. 10-2005-7019021.
English translation of Office Action dated Dec. 25, 2009 in counterpart Japanese Patent Application No. 2007-504874.
U.S. Office Action dated Jun. 7, 2012 for related U.S. Appl. No. 11/606,286.
Office Action for Taiwanese Application No. 96144858 dated Feb. 20, 2012 and English translation thereof.
Office Action for Taiwanese Application No. 96125268 dated Mar. 3, 2012 and English translation thereof.
Lie et al., "Cascading Style Sheets," 2d. (Harlow, England,: Addison Weslsley, 1999.).
Office Action for corresponding U.S. Appl. No. 11/633,029 dated Apr. 20, 2012.

* cited by examiner

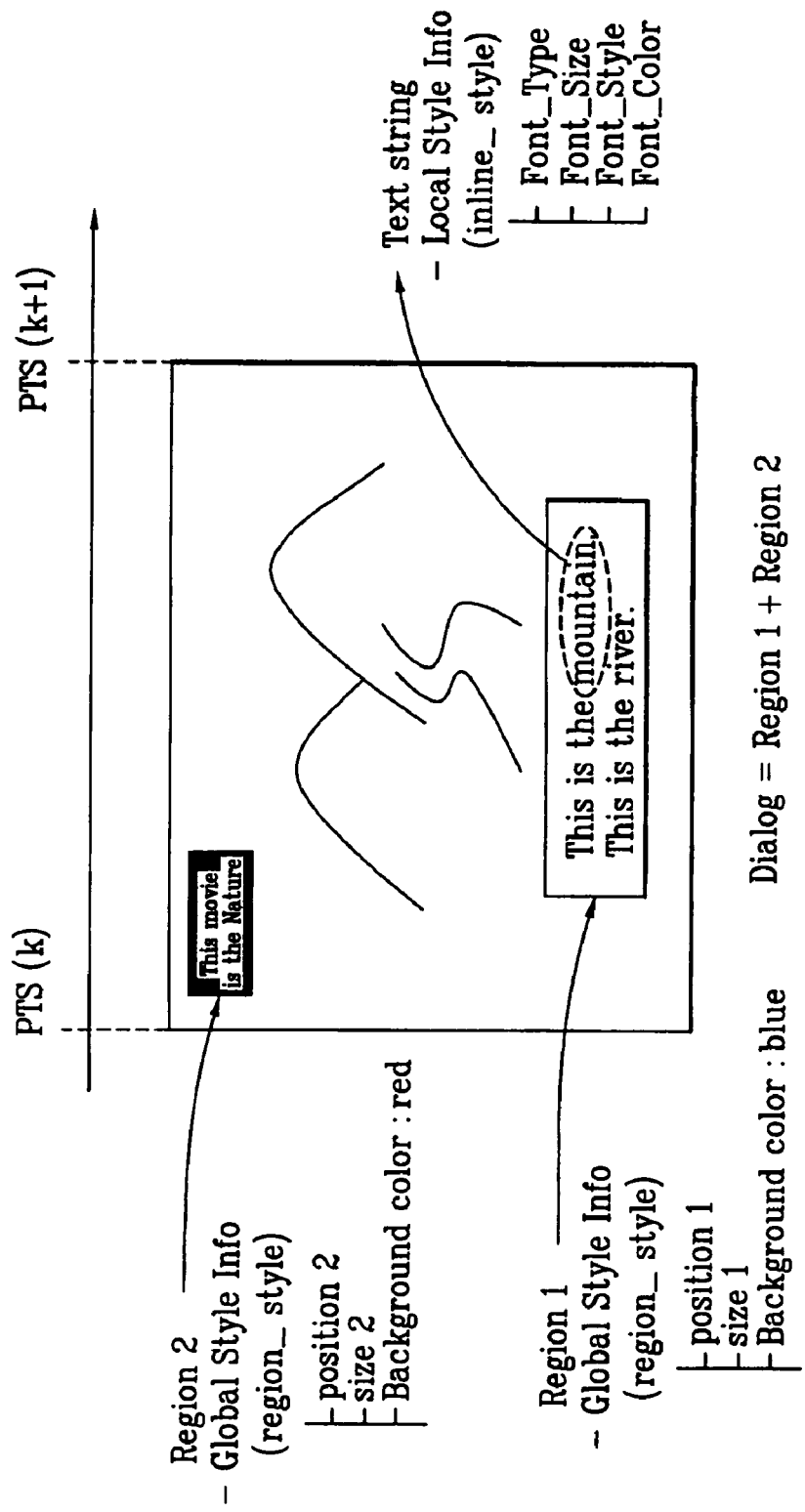

FIG. 7

Dialog Style Segment (DSS)

| Region style id | Style Info |
|---|---|
| 1 | Region style set #1 (User changeable style set) |
| ... | ... |
| k | Region style set #k (User changeable style set) |
| n | Region style set #n (User changeable style set) |
| m | Region style set #m (User changeable style set) |
| ... | ... |
| 60 | Region style set #60 (User changeable style set) |

Dialog Presentation Segment (DPS)

| Region style linking | Timing (PTS set) | Text data | Inline style | |
|---|---|---|---|---|
| Region_style_id = k | start_PTS end_PTS | Text #1 | Inline style | } DPS#1 |
| Region_style_id = k | start_PTS end_PTS | Text #1 | Inline style | Region1 } DPS#2 |
| Region_style_id = n | | Text #2 | Inline style | Region2 |
| Region_style_id = n | start_PTS end_PTS | Text #2 | Inline style | } DPS#3 |
| Region_style_id = m | start_PTS end_PTS | Text #3 | Inline style | } DPS#4 |
| ... | ... | ... | ... | |

FIG. 8

```
Text_subtitle_stream () {
    dialog_style_segment()
    while (processed_length < end_of_file){
        dialog_presentation_segment ()
    }
}
```

FIG. 9A

```
dialog_style_segment () {
    segment_type
    reserved
    segment_length
    dialog_styleset()
}
```

FIG. 9B

```
dialog_styleset () {
    player_style_flag
    reserved
    number_of_region_styles
    for (region_style_id=0;
    region_style_id<number_of_region_styles; region_style_id++) {
        region_style() {
            region_info() {
                region_horizontal_position
                region_vertical_position
                region_width
                region_height
                region_bg_color_index
            }
            text_horizontal_position
            text_vertical_position
            text_flow
            text_alignment
            line_space
            font_id
            font_style
            font_size
            font_color_index
        }
        user_changeable_styleset()
    }
    palette ()
}
```

FIG. 9C

```
user_changeable_styleset () {
    for(user_style_id=0;
    user_style_id<number_of_user_styles;
    user_style_id++){
            User_control_style() {
                region_horizontal_position_direction
                region_horizontal_position_delta
                region_vertical_position_direction
                region_vertical_position_delta
                text_horizontal_position_direction
                text_horizontal_position_delta
                text_vertical_position_direction
                text_vertical_position_delta
                line_space_inc_dec
                line_space_delta
                reserved
                font_size_inc_dec
                font_size_delta
            }
    }
}
```

FIG. 9D

```
palette() {
    length
    while (processed_length < length) {
        palette_entry() {
            palette_entry_id
            Y_value
            Cr_value
            Cb_value
            T_value
```

FIG. 10

```
dialog_presentation_segment () {
    segment_type
    reserved
    segment_length
    dialog_start_PTS
    dialog_end_PTS
    palette_update_flag
    reserved
    if (palette_update_flag==1b) {
        palette()
    }
    ~~
    number_of_regions
    for (region_id=0; region_id<number_of_regions; region_id++)
    {
        dialog_region() {
            continuous_present_flag[region_id]
            region_style_id[region_id]
            region_subtitle()
            ~~
        }
        ~~
    }
    ~~
}
```

FIG. 11A

```
region_subtitle () {
        region_subtitle_length
        while (processed_length < region_subtitle_length) {
                escape_code
                type
                if (type >= 0x02 && type <= 0x05) {
                        inline_style_data_byte
                        }
                }
                if (type == 0x0A) {
                        /* line break */
                }
                if (type == 0x0B) {
                        /* end of inline style */
                }
                if (type == 0x01) {
                        text_string_length
                        text_string() {
                                for (i=0; i<text_string_length; i++) {
                                        char_data_byte
                                }
                        }
                }
        }
}
```

FIG. 11B

| Type | Meanings | inline_style_length or text_string_length |
|---|---|---|
| 0x00 | reserved | |
| 0x01 | Text string start | Length of the text string |
| 0x02 | Change a Font set | 1 |
| 0x03 | Change a font style | 1 |
| 0x04 | Change a font size | 1 |
| 0x05 | Change a font color | 1 |
| other values | reserved | |
| 0x0A | Line break | 0 |
| 0x0B | End of inline style | 0 |

FIG. 12A

```
region_subtitle () {
        region_subtitle_length
        while (processed_length < region_subtitle_length) {
                escape_code
                string_flag
                reserved
                if (string_flag == 0b) {
                        number_of_inline_styles
                        for (i=0; i<number_of_inline_styles; i++) {
                                inline_style_type
                                if (inline_style_type != 0x0A) {
                                        inline_style_data_byte
                                }
                        }
                }
                else {
                        text_string_length
                        text_string() {
                                for (i=0; i<text_string_length; i++) {
                                        char_data_byte
                                }
                        }
                }
        }
}
```

FIG. 12B (string_flag = 0b)

| inline_style_type | Meanings | inline_style_length |
|---|---|---|
| 0x00 | reserved | |
| 0x01 | Change a Font set | 1 |
| 0x02 | Change a font style | 1 |
| 0x03 | Change a font size | 1 |
| 0x04 | Change a font color | 1 |
| other values | reserved | |
| 0x0A | Line break | 0 |
| 0x0B | End of inline style | 0 |

FIG. 13A

```
region_subtitle () {
        region_subtitle_length
        while (processed_length < region_subtitle_length) {
                escape_code
                data_type
                reserved
                if (data_type == 0b) {
                        inline_style_length
                        inline_style() {
                                for (i=0; i<inline_style_length; i++) {
                                        inline_style_type
                                        inline_style_data_byte
                                }
                        }
                }
                else {
                        text_string_length
                        text_string() {
                                for (i=0; i<text_string_length; i++) {
                                        char_data_byte
                                }
                        }
                }
        }
}
```

FIG. 13B (data_type = 0b)

| inline_style_type | Meanings | data_length |
|---|---|---|
| 0x00 | reserved | |
| 0x01 | Change a Font set | 1 |
| 0x02 | Change a font style | 1 |
| 0x03 | Change a font size | 1 |
| 0x04 | Change a font color | 1 |
| other values | reserved | |
| 0x0A | Line break | 0 |
| 0x0B | End of inline style | 0 |

RECORDING MEDIUM STORING A TEXT SUBTITLE STREAM INCLUDING A STYLE SEGMENT AND A PLURALITY OF PRESENTATION SEGMENTS, METHOD AND APPARATUS FOR REPRODUCING A TEXT SUBTITLE STREAM INCLUDING A STYLE SEGMENT AND A PLURALITY OF PRESENTATION SEGMENTS

PRIORITY INFORMATION

This is a continuation application of application Ser. No. 11/070,239 filed Mar. 3, 2005 now U.S. Pat. No. 7,809,244, the entire contents of which are hereby incorporated by reference.

This application claims the benefit of Korean Patent Application No. 10-2004-0020891, filed on Mar. 26, 2004, which is hereby incorporated by reference as if fully set forth herein.

BACKGROUND OF THE INVENTION

1. Field of the Invention

The present invention relates to a recording medium, and more particularly, to a recording medium and method and apparatus for reproducing and recording text subtitle streams. Although the present invention is suitable for a wide scope of applications, it is particularly suitable for recording the text subtitle stream file within the recording medium and effectively reproducing the recorded text subtitle stream.

2. Discussion of the Related Art

Optical discs are widely used as an optical recording medium for recording mass data. Presently, among a wide range of optical discs, a new high-density optical recording medium (hereinafter referred to as "HD-DVD"), such as a Blu-ray Disc (hereafter referred to as "BD"), is under development for writing and storing high definition video and audio data. Currently, global standard technical specifications of the Blu-ray Disc (BD), which is known to be the next generation technology, are under establishment as a next generation optical recording solution that is able to have a data significantly surpassing the conventional DVD, along with many other digital apparatuses.

Accordingly, optical reproducing apparatuses having the Blu-ray Disc (BD) standards applied thereto are also being developed. However, since the Blu-ray Disc (BD) standards are yet to be completed, there have been many difficulties in developing a complete optical reproducing apparatus. Particularly, in order to effectively reproduce the data from the Blu-ray Disc (BD), not only should the main AV data as well as various data required for a user's convenience, such as subtitle information as the supplementary data related to the main AV data, be provided, but also managing information for reproducing the main data and the subtitle data recorded in the optical disc should be systemized and provided.

However, in the present Blu-ray Disc (BD) standards, since the standards of the supplementary data, particularly the subtitle stream file, are not completely consolidated, there are many restrictions in the full-scale development of a Blu-ray Disc (BD) basis optical reproducing apparatus. And, such restrictions cause problems in providing the supplementary data such as subtitles to the user.

SUMMARY OF THE INVENTION

Accordingly, the present invention is directed to a recording medium and method and apparatus for reproducing and recording text subtitle streams that substantially obviate one or more problems due to limitations and disadvantages of the related art.

An object of the present invention is to provide a method of creating a set of style information when recording a text subtitle stream file within the recording medium according to the present invention.

Another object of the present invention is to provide a method and apparatus for reproducing a text subtitle stream that can effectively reproduce the above-described text subtitle stream according to the present invention.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium for reproducing text subtitle streams includes a data area storing at least one text subtitle stream, each text subtitle stream including a dialog style segment defining a set of region styles and at least one dialog presentation segment, each dialog presentation segment containing at least one region of dialog text, each region of dialog text being linked to one of the set of region styles and including at least one pair of an inline style and a text string, the inline style being configured to change one of region presentation properties specified by the linked region style for the text string.

The each region of dialog text may include a data type field which indicates that data immediately following the data type field represent the text string, and the each region of dialog text may include an escape code immediately preceding the data type field so as to distinguish the data representing the text string from data preceding the escape code. Additionally, the each region of dialog text may include a data type field which indicates that data immediately following the data type field represent the inline style.

Furthermore, the each region of dialog text may include an escape code immediately preceding the data type field so as to distinguish the data representing the inline style from data preceding the escape code. Herein, the data type field may further indicate a type of the inline style. Also, the each region of dialog text may include a line-break field indicating that the text string is drawn in a new line, and the each region of dialog text may also include an end-of-inline-style field indicating that the inline style is reset to the region presentation properties specified by the linked region style.

In another aspect of the present invention, a method of reproducing text subtitle streams includes reproducing at least one text subtitle stream recorded on a recording medium, each text subtitle stream including a dialog style segment defining a set of region styles and at least one dialog presentation segment, each dialog presentation segment containing at least one region of dialog text, each region of dialog text being linked to one of the set of region styles and including at least one pair of an inline style and a text string, the inline style being configured to change one of region presentation properties specified by the linked region style for the text string.

In another aspect of the present invention, an apparatus for reproducing text subtitle streams includes a driver configured to drive an optical reproducing device to reproduce data recorded on a recording medium, and a controller configured to control the driver to reproduce at least one text subtitle stream recorded on the recording medium, each text subtitle stream including a dialog style segment defining a set of region styles and at least one dialog presentation segment, each dialog presentation segment containing at least one region of dialog text, each region of dialog text being linked to one of the set of region styles and including at least one pair of an inline style and a text string, the inline style being configured to change one of region presentation properties specified by the linked region style for the text string.

In another aspect of the present invention, a method for recording text subtitle streams includes recording at least one text subtitle stream on a recording medium, each text subtitle stream including a dialog style segment defining a set of region styles and at least one dialog presentation segment, each dialog presentation segment containing at least one region of dialog text, each region of dialog text being linked to one of the set of region styles and including at least one pair of an inline style and a text string, the inline style being configured to change one of region presentation properties specified by the linked region style for the text string.

In a further aspect of the present invention, an apparatus for recording text subtitle streams includes a driver configured to drive an optical recording device to record data on a recording medium, and a controller configured to control the driver to record at least one text subtitle stream on the recording medium, each text subtitle stream including a dialog style segment defining a set of region styles and at least one dialog presentation segment, each dialog presentation segment containing at least one region of dialog text, each region of dialog text being linked to one of the set of region styles and including at least one pair of an inline style and a text string, the inline style being configured to change one of region presentation properties specified by the linked region style for the text string.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 5A to 5C illustrate applications of the reproduction control information for reproducing the text subtitle stream according to the present invention;

FIG. 7 illustrates an application of a set of style information to the structure of the text subtitle stream file according to the present invention;

FIG. 8 illustrates a syntax of the text subtitle stream file according to the present invention;

FIGS. 9A to 9D illustrate another example of syntax of the text subtitle stream file according to the present invention;

FIG. 10 illustrates another example of syntax of the text subtitle stream file according to the present invention;

FIGS. 11A and 11B illustrate an example of a syntax of a region subtitle among the text subtitle stream file according to a first embodiment of the present invention;

FIGS. 12A and 12B illustrate an example of a syntax of a region subtitle among the text subtitle stream file according to a second embodiment of the present invention;

FIGS. 13A and 13B illustrate an example of a syntax of a region subtitle among the text subtitle stream file according to a third embodiment of the present invention.

DETAILED DESCRIPTION OF THE INVENTION

Figure 1:
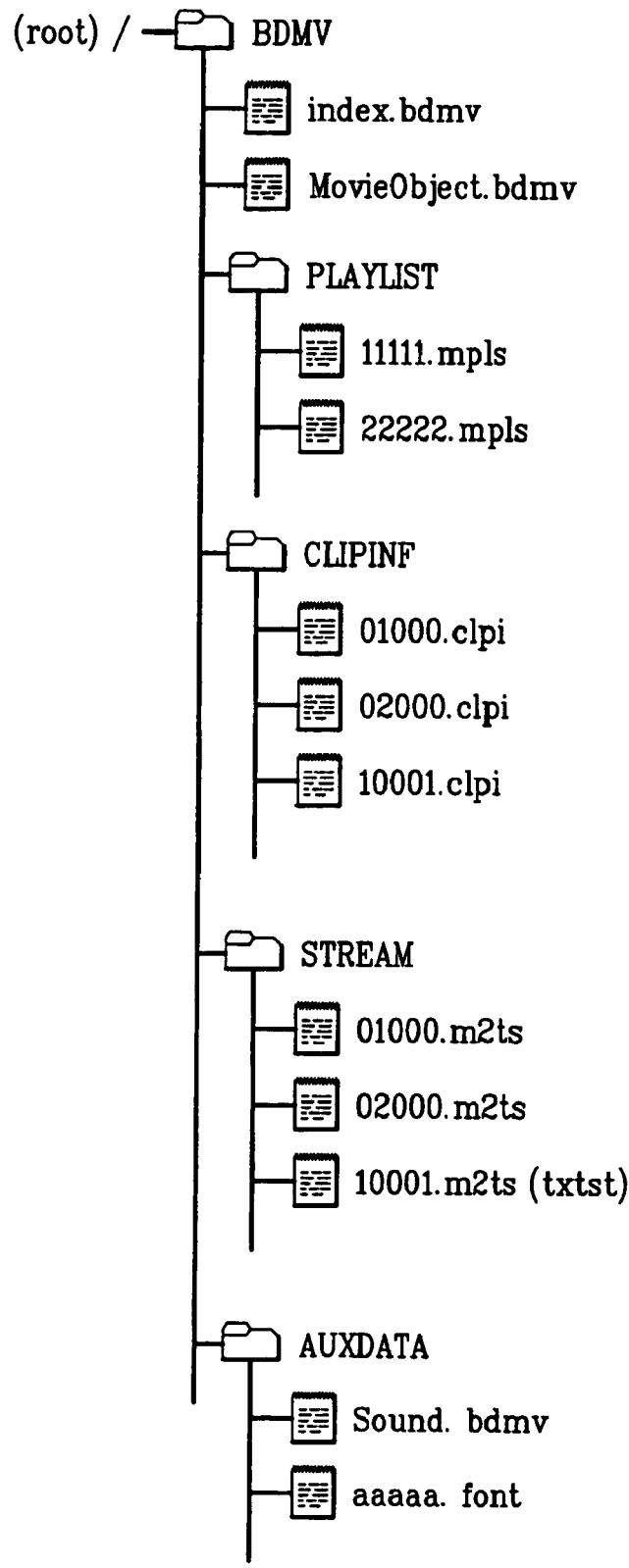
FIG. 1 illustrates a structure of the data files recorded in an optical disc according to the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium.

In this detailed description, "main data" represent audio/video (AV) data that belong to a title (e.g., a movie title) recorded in an optical disc by an author. In general, the AV data are recorded in MPEG2 format and are often called AV streams or main AV streams. In addition, "supplementary data" represent all other data required for reproducing the main data, examples of which are text subtitle streams, interactive graphic streams, presentation graphic streams, and supplementary audio streams (e.g., for a browsable slideshow). These supplementary data streams may be recorded in MPEG2 format or in any other data format. They could be multiplexed with the AV streams or could exist as independent data files within the optical disc.

A "subtitle" represents caption information corresponding to video (image) data being reproduced, and it may be represented in a predetermined language. For example, when a user selects an option for viewing one of a plurality of subtitles represented in various languages while viewing images on a display screen, the caption information corresponding to the selected subtitle is displayed on a predetermined portion of the display screen. If the displayed caption information is text data (e.g., characters), the selected subtitle is often called a "text subtitle". According to one aspect of the present invention, a plurality of text subtitle streams in MPEG2 format may be recorded in an optical disc, and they may exist as a plurality of independent stream files. Each "text subtitle stream file" is created and recorded within an optical disc. And, the purpose of the present invention is to provide a method and apparatus for reproducing the recorded text subtitle stream file.

FIG. 1 illustrates a file structure of the data files recorded in a Blu-ray disc (hereinafter referred to as "BD") according to the present invention. Referring to FIG. 1, at least one BD directory (BDMV) is included in a root directory (root). Each BD directory includes an index file (index.bdmv) and an object file (MovieObject.bdmv), which are used for interacting with one or more users. For example, the index file may contain data representing an index table having a plurality of selectable menus and movie titles. Each BD directory further includes four file directories that include audio/video (AV) data to be reproduced and various data required for reproduction of the AV data.

The file directories included in each BD directory are a stream directory (STREAM), a clip information directory (CLIPINF), a playlist directory (PLAYLIST), and an auxiliary data directory (AUX DATA). First of all, the stream directory (STREAM) includes audio/video (AV) stream files having a particular data format. For example, the AV stream files may be in the form of MPEG2 transport packets and be named as "*.m2ts", as shown in FIG. 1. The stream directory may further include one or more text subtitle stream files, where each text subtitle stream file includes text (e.g., characters) data for a text subtitle represented in a particular language and reproduction control information of the text data. The text subtitle stream files exist as independent stream files within the stream directory and may be named as "*.m2ts" or "*.txtst", as shown in FIG. 1. An AV stream file or text subtitle stream file included in the stream directory is often called a clip stream file.

Next, the clip information directory (CLIPINF) includes clip information files that correspond to the stream files (AV or text subtitle) included in the stream directory, respectively. Each clip information file contains property and reproduction timing information of a corresponding stream file. For example, a clip information file may include mapping information, in which presentation time stamps (PTS) and source packet numbers (SPN) are in a one-to-one correspondence and are mapped by an entry point map (EPM), depending upon the clip type. Using the mapping information, a particular location of a stream file may be determined from a set of timing information (In-Time and Out-Time) provided by a PlayItem or SubPlayItem, which will be discussed later in more details. In the industry standard, each pair of a stream file and its corresponding clip information file is designated as a clip. For example, 01000.clpi included in CLIPINF includes property and reproduction timing information of 01000.m2ts included in STREAM, and 01000.clpi and 01000.m2ts form a clip.

Referring back to FIG. 1, the playlist directory (PLAYLIST) includes one or more PlayList files (*.mpls), where each PlayList file includes at least one PlayItem that designates at least one main AV clip and the reproduction time of the main AV clip. More specifically, a PlayItem contains information designating In-Time and Out-Time, which represent reproduction begin and end times for a main AV clip designated by Clip_Information_File_Name within the PlayItem. Therefore, a PlayList file represents the basic reproduction control information for one or more main AV clips. In addition, the PlayList file may further include a SubPlayItem, which represents the basic reproduction control information for a text subtitle stream file. When a SubPlayItem is included in a PlayList file to reproduce one or more text subtitle stream files, the SubPlayItem is synchronized with the PlayItem(s). On the other hand, when the SubPlayItem is used to reproduce a browsable slideshow, it may not be synchronized with the PlayItem(s). According to the present invention, the main function of a SubPlayItem is to control reproduction of one or more text subtitle stream files.

Lastly, the auxiliary data directory (AUX DATA) may include supplementary data stream files, examples of which are font files (e.g., aaaaa.font or aaaaa.otf), pop-up menu files (not shown), and sound files (e.g., Sound.bdmv) for generating click sound. The text subtitle stream files mentioned earlier may be included in the auxiliary data directory instead of the stream directory.

Figure 2:
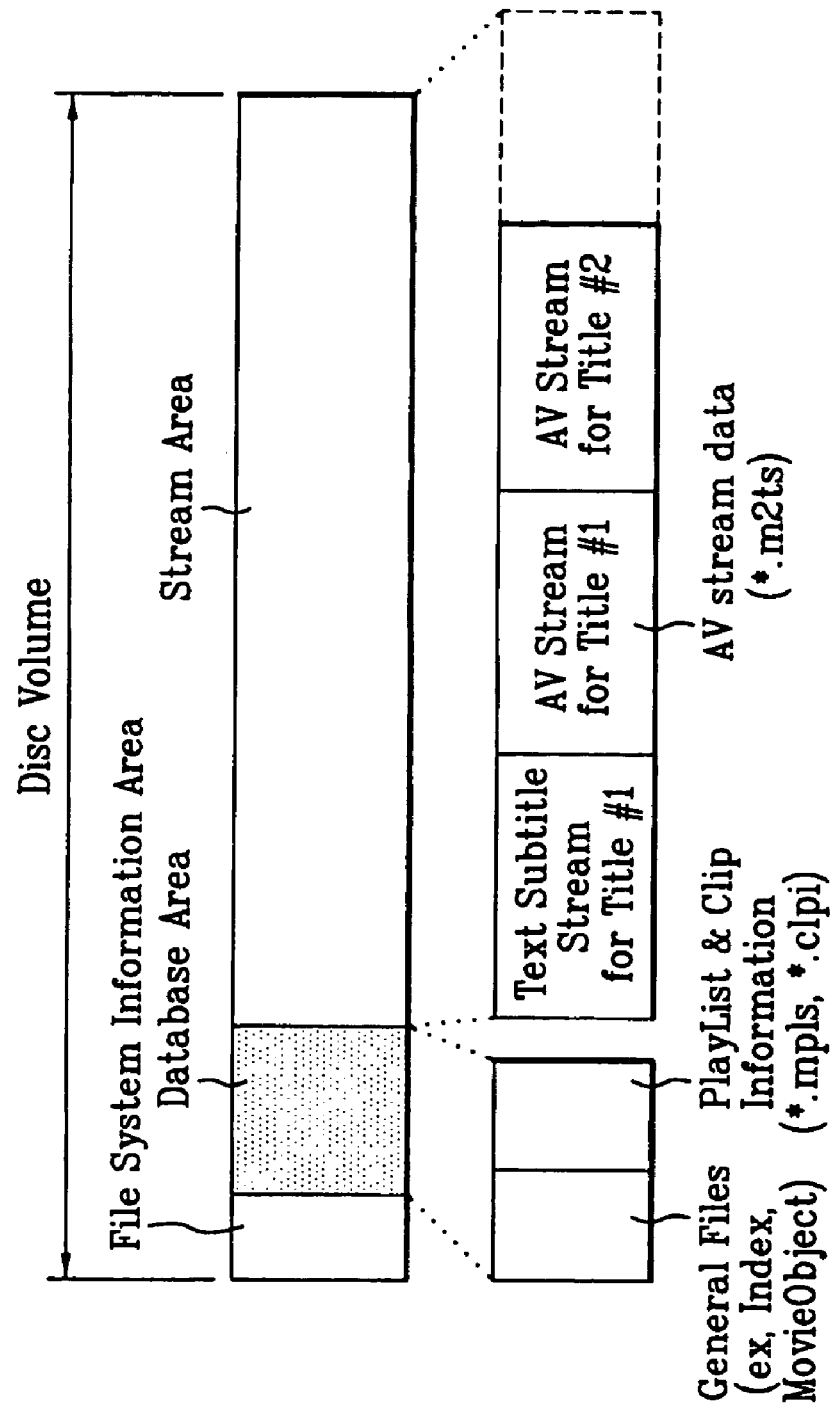
FIG. 2 illustrates data storage areas of the optical disc according to the present invention.

FIG. 2 illustrates data storage areas of an optical disc according to the present invention. Referring to FIG. 2, the optical disc includes a file system information area occupying the inmost portion of the disc volume, a stream area occupying the outmost portion of the disc volume, and a database area occupied between the file system information area and the stream area. In the file system information area, system information for managing the entire data files shown in FIG. 1 is stored. Next, main data and supplementary data (i.e., AV streams and one or more text subtitle streams) are stored in the stream area. The main data may include audio data, video data, and graphic data. And, the supplementary data (i.e., the text subtitle) is independently stored in the stream area without being multiplexed with the main data. The general files, PlayList files, and clip information files shown in FIG. 1 are stored in the database area of the disc volume. As discussed above, the general files include an index file and an object file, and the PlayList files and clip information files include information required to reproduce the AV streams and the text subtitle streams stored in the stream area. Using the information stored in the database area and/or stream area, a user is able to select a specific playback mode and to reproduce the main AV and text subtitle streams in the selected playback mode.

Figure 3:
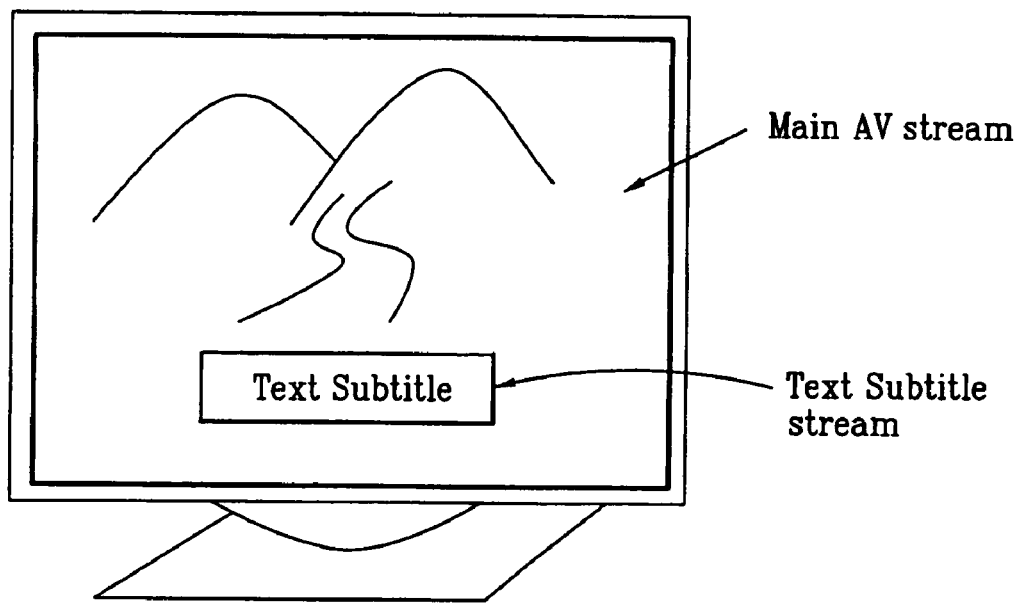
FIG. 3 illustrates a text subtitle and a main image presented on a display screen according to the present invention.

Hereinafter, the structure of the text subtitle stream file according to the present invention will be described in detail. First of all, the control information for reproducing the text subtitle stream will be newly defined. Then, the detailed description of the method of creating the text stream file including the newly defined control information, and the method and apparatus of reproducing the text subtitle stream for reproducing the recorded stream file will follow. FIG. 3 illustrates a text subtitle and a main image presented on a display screen according to the present invention. The main image and the text subtitle are simultaneously displayed on the display screen when a main AV stream and a corresponding text subtitle stream are reproduced in synchronization.

Figure 4:
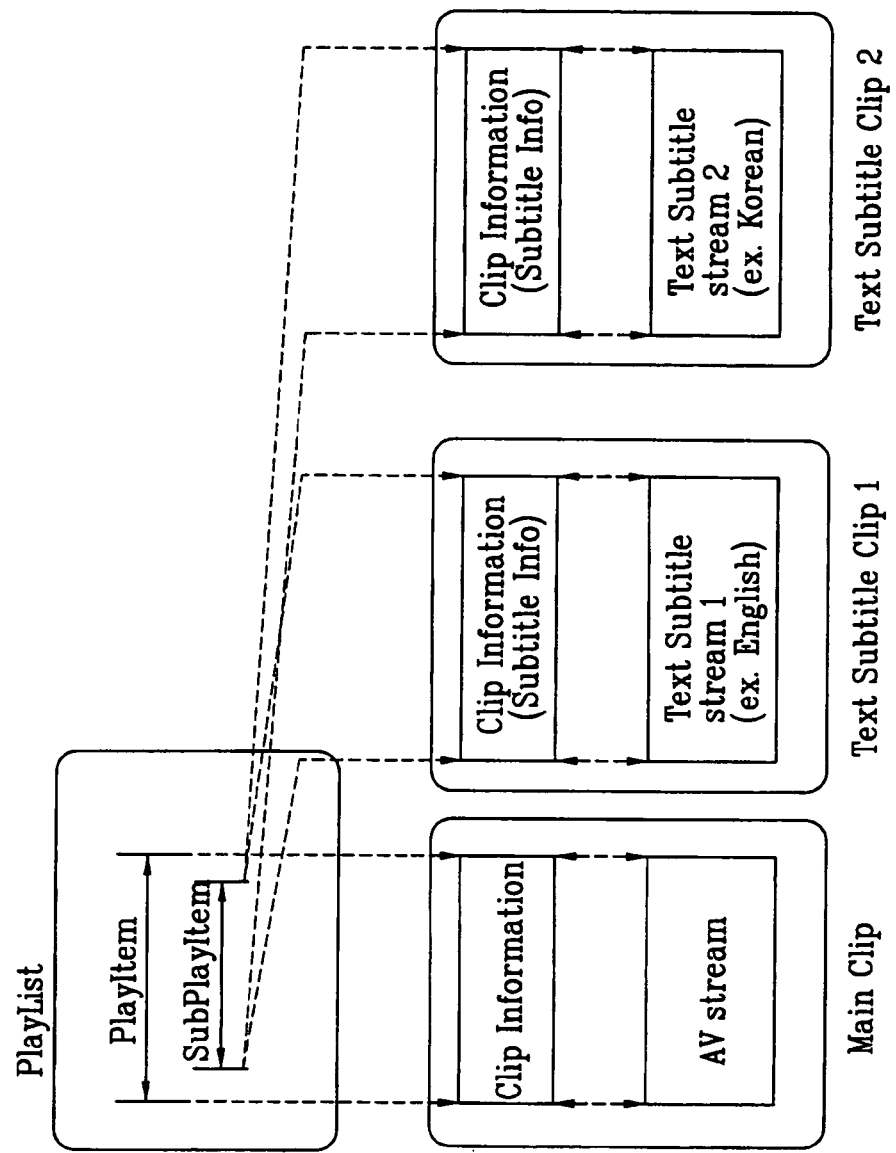
FIG. 4 illustrates a schematic diagram illustrating reproduction control of a text subtitle stream according to the present invention.

FIG. 4 is a schematic diagram illustrating reproduction control of a main AV clip and text subtitle clips according to the present invention. Referring to FIG. 4, a PlayList file includes at least one PlayItem controlling reproduction of at least one main AV clip and a SubPlayItem controlling reproduction of a plurality of text subtitle clips. One of text subtitle clip 1 and text subtitle clip 2, shown in FIG. 4, for English and Korean text subtitles may be synchronized with the main AV clip such that a main image and a corresponding text subtitle are displayed on a display screen simultaneously at a particular presentation time. In order to display the text subtitle on the display screen, display control information (e.g., position and size information) and presentation time information, examples of which are illustrated in FIG. 5A to FIG. 5C, are required.

Figure 5A:
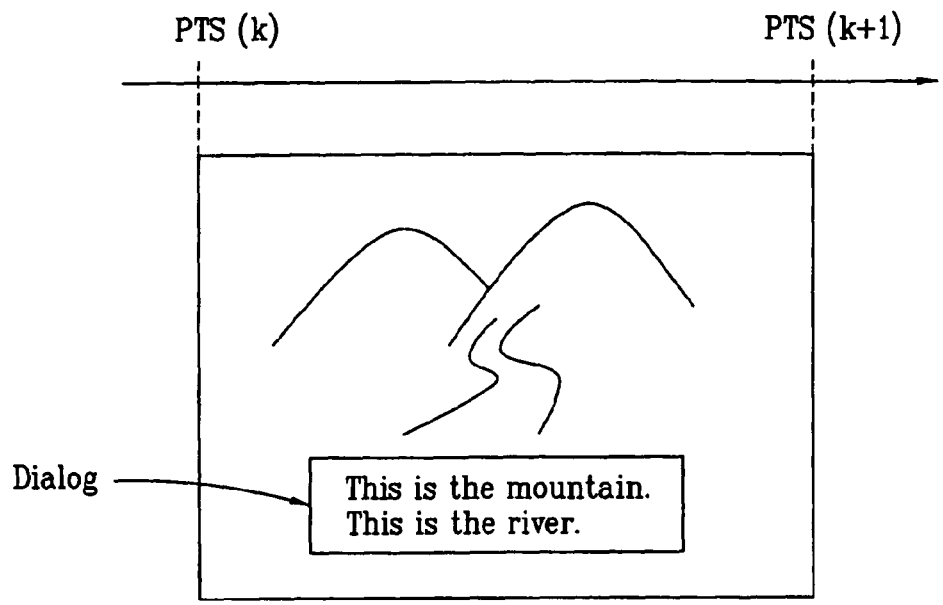

FIG. 5A illustrates a dialog presented on a display screen according to the present invention. A dialog represents entire text subtitle data displayed on a display screen during a given presentation time. In general, presentation times of the dialog may be represented in presentation time stamps (PTS). For example, presentation of the dialog shown in FIG. 5A starts at PTS (k) and ends at PTS (k+1). Therefore, the dialog shown in FIG. 5A represents an entire unit of text subtitle data which are displayed on the display screen between PTS (k) and PTS (k+1). A dialog includes a maximum of 100 character codes in one text subtitle.

Figure 5B:
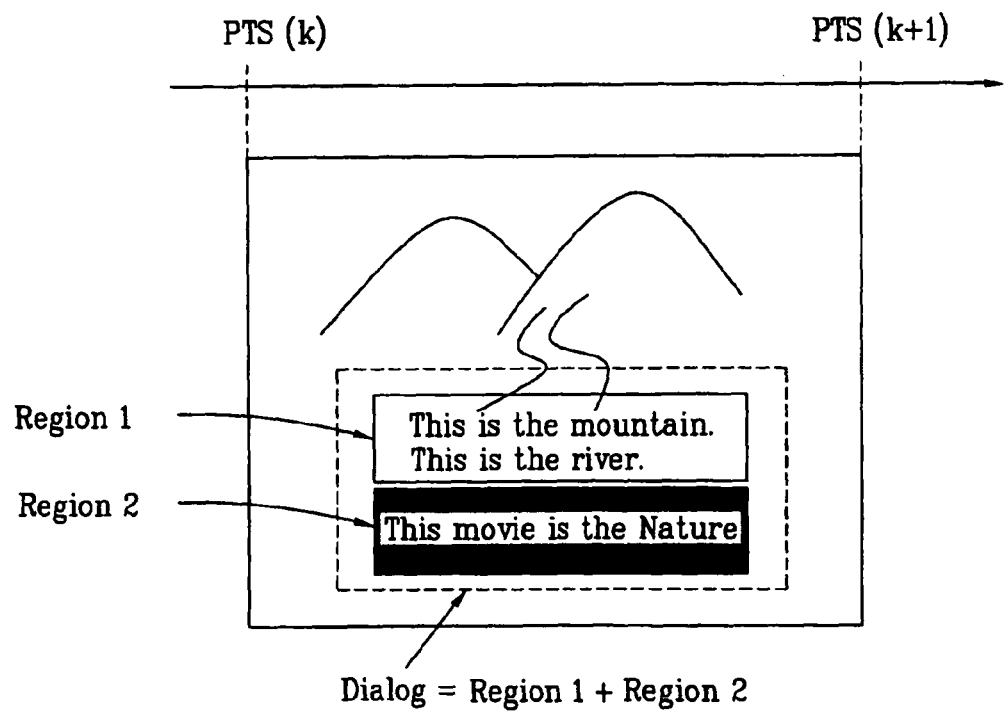

In addition, FIG. 5B illustrates regions of a dialog according to the present invention. A region represents a divided portion of text subtitle data (dialog) displayed on a display screen during a given presentation time. In other words, a dialog includes at least one region, and each region may include at least one line of subtitle text. The entire text subtitle data representing a region may be displayed on the display screen according to a region style (global style) assigned to the region. The maximum number of regions included in a dialog should be determined based on a desired decoding rate of the subtitle data because the greater number of regions generally results in a lower decoding ratio. For example, the maximum number of regions for a dialog may be limited to two in order to achieve a reasonably high decoding rate.

FIG. 5C illustrates style information for regions of a dialog according to the present invention. Style information represents information defining properties required for displaying at least a portion of a region included in a dialog. Some of the examples of the style information are position, region size, background color, text alignment, text flow information, and many others. The style information may be classified into region style information (global style information) and inline style information (local style information).

Region style information defines a region style (global style) which is applied to an entire region of a dialog. For example, the region style information may contain at least one of a region position, region size, font color, background color, text flow, text alignment, line space, font name, font style, and font size of the region. For example, two different region styles are applied to region 1 and region 2, as shown in FIG. 5C. A region style with position 1, size 1, and blue background color is applied to Region 1, and a different region style with position 2, size 2, and red background color is applied to Region 2.

On the other hand, inline style information defines an inline style (local style) which is applied to a particular portion of text strings included in a region. For example, the inline style information may contain at least one of a font type, font size, font style, and font color. The particular portion of text strings may be an entire text line within a region or a particular portion of the text line. Referring to FIG. 5C, a particular inline style is applied to the text portion "mountain" included in Region 1. In other words, at least one of the font type, font size, font style, and font color of the particular portion of text strings is different from the remaining portion of the text strings within Region 1.

Figure 6:
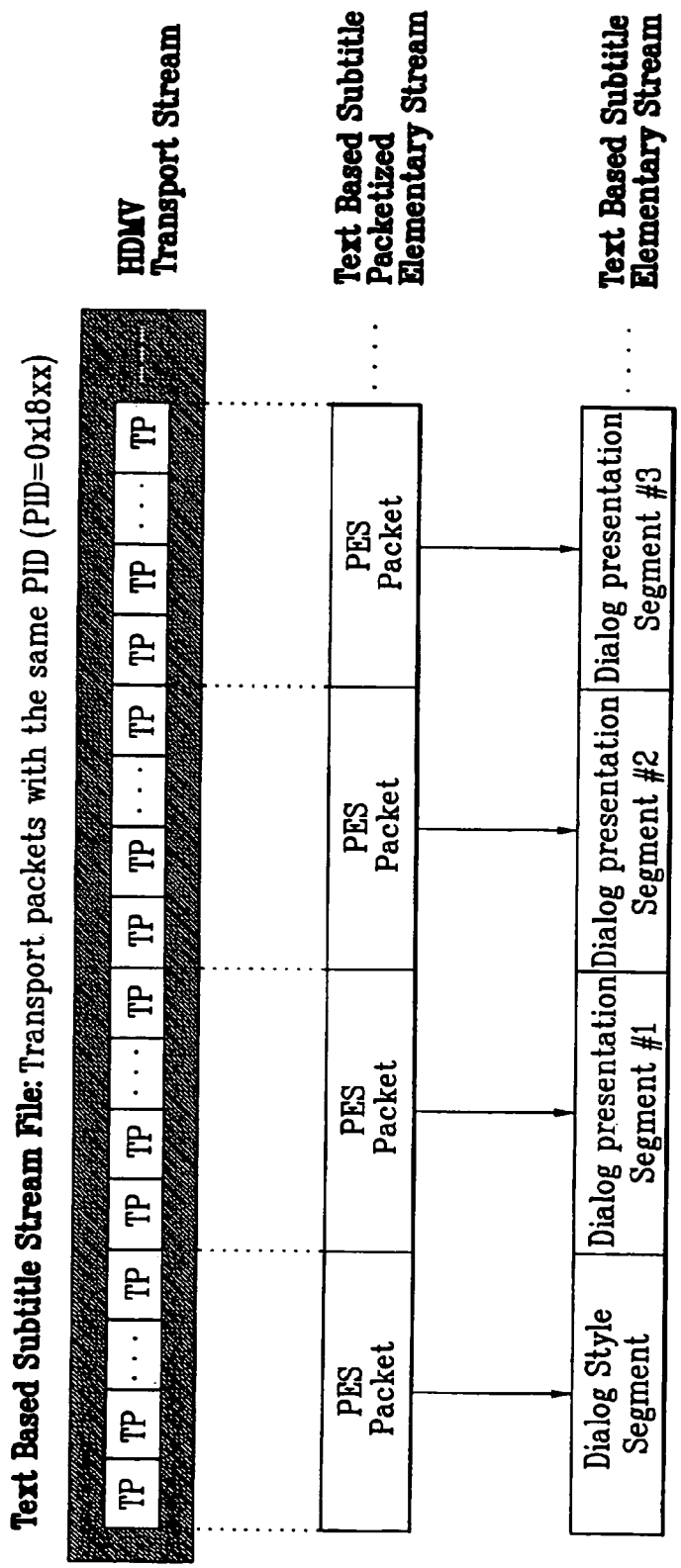
FIG. 6 illustrates the structure of a text subtitle stream file according to the present invention.

Accordingly, the above-described text data is recorded and described as a "text string" depending upon whether a specific inline style exists, and the text data will be described in more detail with reference to FIG. 11A to FIG. 13B. FIG. 6 illustrates a text subtitle stream file (e.g., 10001.m2ts shown in FIG. 1) according to the present invention. The text subtitle stream file may be formed of an MPEG2 transport stream including a plurality of transport packets (TP), all of which have a same packet identifier (e.g., PID=0x18xx). When a disc player receives many input streams including a particular text subtitle stream, it finds all the transport packets that belong to the text subtitle stream using their PIDs. Referring to FIG. 6, each sub-set of transport packets form a packet elementary stream (PES) packet. One of the PES packets shown in FIG. 6 corresponds to a dialog style segment (DSS) defining a group of region styles. All the remaining PES packets after the second PES packet correspond to dialog presentation segments (DPSs).

In the above-described text subtitle stream structure of FIG. 6, each of the dialog information shown in FIGS. 5A to 5C represent a dialog presentation segment (DPS). And, the style information included in the dialog information represents a set of information that links any one of the plurality of region style sets defined in the dialog style segment (DSS), which can also be referred to as "region_style_id", and inline styles. A standardized limited number of region style sets is recorded in the dialog style segment (DSS). For example, a maximum of 60 sets of specific style information is recorded, each of which is described by a region_style_id.

FIG. 7 illustrates structures of the dialog style segment (DSS) recorded in the text subtitle stream, and of the dialog presentation segment (DPS). Accordingly, a detailed syntax of the text subtitle stream will be described in a later process with reference to FIG. 8. More specifically, the dialog style segment (DSS) includes a maximum of 60 sets of region style is recorded therein, each of which is described by a region_style_id. A region style set, which includes diverse region style information, and a user changeable style set are recorded in each region_style_id. Herein, detailed contents of the region style information will be described in FIG. 9B, and detailed contents of the user changeable style information will be described in FIG. 9C.

Furthermore, the dialog presentation segment (DPS) includes text data and timing information indicating the presentation time of the text data (i.e., PTS set). The dialog presentation segment (DPS) also includes information linking any one of the style information for each region and the specific region style information included in the above-described dialog style. Therefore, DPS #1 is formed of a single region, and the region style applied to the text data (Text data #1) is applied to region_style_id=k included in the dialog presentation segment (DPS). DPS #2 is formed of two regions, and the region style applied to the text data (Text data #1) of the first region is applied to region_style_id=k included in the dialog presentation segment (DPS). And, the region style applied to the text data (Text data #2) of the second region is applied to region_style_id=n included in the dialog presentation segment (DPS). Similarly, DPS #3 and DPS #4 applies region_style_id=n and region_style_id=m to each corresponding style information within the dialog presentation segment (DPS), respectively.

Accordingly, when two regions exist within a single dialog, such as in DPS #2, each of the region_style_id applied to each region should be given a different value. More specifically, as described above, region_style_id=k is applied to the first region within DPS #2, and region_style_id=n is applied to the second region within DPS #2, thereby respectively applying different region style sets. When an identical region_style_id is applied to each region, then the two regions are overlapped on the screen, which causes difficulty in displaying the text subtitle. Meanwhile, the style information being linked by the region_style_id is identically applied to all of the text data within the corresponding region (i.e., global style information). However, the inline style information, which is a set of local style information being applied only to the corresponding text string, is newly defined and applied when the style information of a specific text string within the text data is to be modified.

The syntax structure of the above-described dialog style segment (DSS) and the dialog presentation segment (DPS) will now be described in detail with reference to FIGS. 8 to 10B. FIG. 8 illustrates a syntax of the text subtitle stream (Text_subtitle_stream( )) according to the present invention. Referring to FIG. 8, the Text_subtitle_stream( ) includes a dialog_style_segment( ) syntax and a dialog_ presentation_segment( ) syntax. More specifically, the dialog_style_segment( ) syntax corresponds to a single dialog style segment (DSS) defining the style information set, and the dialog_presentation_segment( ) syntax corresponds to a plurality of dialog presentation segments (DPS) having the actual dialog information recorded therein.

FIGS. 9A to 9C illustrate a detailed structure of the dialog_style_segment( ), which represent the dialog style segment (DSS). More specifically, FIG. 9A illustrates the overall structure of the dialog_style_segment( ), wherein a dialog_style set( ) defining diverse style information sets that are applied in the dialog is defined. FIG. 9B illustrates a dialog_style set( ) according to the present invention, which is defined in the dialog_style_segment( ). Apart from the region_styles, the dialog_style_set( ) includes a Player_ style_flag, a user_changeable_style set( ), and a palette( ). The Player_style_flag indicates whether change in style information by the player is authorized. Also, the user_changeable_style set( ) defines the range of change in style information by the player, and the palette( ) indicates color information.

The region style information (region_styles) represents Global style information defined for each region, as described above. A region_style_id is assigned to each region, and a style information set corresponding to the specific region_style_id is defined. Therefore, when reproducing a dialog by recording the region_style_id, which is applied to the corresponding dialog, within the dialog presentation segment (DPS), style information set values defined by identical region_style_id within the dialog_style set( ) are applied, so as to reproduce the dialog. Accordingly, individual style information included in the style information set provided to each region_style_id will now be described.

Herein, region_horizontal_position, region_vertical_ position, region_width, and region_height are provided as information for defining the position and size of a corresponding region within the screen. And, region_bg_color_index information deciding a background color of the corresponding region is also provided. In addition, as information defining an original (or starting) position of the text within the corresponding region, a text_horizontal_position and a text_vertical_position are provided. Also, a text_flow defining the direction of the text (e.g., left→right, right→left, up→down), and a text_alignment defining the alignment direction of the text (e.g., left, center, right) are provided. More specifically, when a plurality of regions are included in a specific dialog, the text_flow of each region included in the corresponding dialog is defined to have an identical text_flow value, so as to prevent users from viewing disturbed images.

Furthermore, a line_space designating space between each line within the region is provided as individual style information included in the style information set. And, a font_type, a font-size, and a font_color_index are provided as font information for actual font information. Meanwhile, the Player_style_flag recorded within the dialog_style set( ) indicates whether an author may apply the style information provided to the player. For example, when Player_style_flag=1b, as well as the style information defined in the dialog_style set( ) recorded in a disc, the player is authorized to reproduce the text subtitle stream by applying the style information provided within the player itself. On the other hand, when Player_style_flag=0b, only usage of the style information defined in the dialog_style set( ) recorded within the disc is authorized.

FIG. 9C illustrates the user_changeable_style set( ) according to the present invention, which is defined in dialog_style set( ). The user_changeable_style set( ) pre-defines the types of style information that can be changed by the user and the range of change, and the user_changeable_style set( ) is used for easily changing the style information of the text subtitle data. However, when the user is enabled to change all style information, which are described in FIG. 9B, the user may more confused. Therefore, in the present invention, the style information of only the font_size, the region_ horizontal_position, and the region_vertical_position may be changed. And, accordingly, variation in the text position and the line space, which may be changed in accordance with the font_size, is also defined in the user_changeable_style set( ). More specifically, the user_changeable_style set( ) is defined for each region_style_id. For example, a maximum of 25 user_style_id within a specific region_style_id=k may be defined in the user_changeable_style set( ).

Also, each user_style_id includes region_horizontal_ position_direction and region_vertical_position_direction information, which designate the direction of the changed position of each of the changeable region_horizontal_ position and region_vertical_position. Each user_style_id also includes region_horizontal_position_delta and region_vertical_position_delta information for designating a single position movement unit in each direction as a pixel unit. More specifically, for example, when region_ horizontal_position_direction=0, the position of the region is moved to a right direction. And, when region_ horizontal_position_direction=1, the position of the region is moved to a left direction. Also, when region_vertical_ position direction=0, the position of the region is moved to a downward direction. Finally, when region_vertical_ position _direction=1, the position of the region is moved to an upward direction.

Furthermore, each user_style_id includes font_size_ inc_dec information, which designates the changing direction each of the changeable font_size, and font_size_delta information for designating a single position movement unit in each direction as a pixel unit. More specifically, for example, font_size_inc_dec=0 represents an increasing direction of the font_size, and font_size_inc_dec=1 represents a decreasing direction of the font_size. Moreover, the decrease or increase of the "text position" and the "line space", which are changed depending upon the decrease or increase of the font_size, may be defined by the same method as that of the font_size, the region_horizontal_position, and the region_vertical_position.

Accordingly, the characteristics of the user_ changeable_style set( ) according to the present invention will now be described as follows. An identical number of user_control_style( ) is defined in all region_style( ) that are included in the dialog style segment (DSS). Accordingly, the number of user_control_style that can be applied to all of the dialog presentation segments (DPS) is also identical. Further, each user_control_style( ) is represented by a different user_style_id, and when the user selects a random user_ id_style, an identical order of the user_control_style( ) is applied to all region_style( ). In addition, a combination of all changeable styles is defined in a single user_control_style( ).

More specifically, the region_position, and the font_size are defined simultaneously, instead of being defined separately. Finally, each of the direction (*_direction) and the indication of increase or decrease (*_inc_dec) is recorded independently regardless of each position movement unit (*_delta). More specifically, by defining only the position movement unit (*_delta), a final value of the actually changed style information (or style value) may be obtained by adding the position movement unit (*_delta) to the value defined in the region_style( ).

FIG. 9D illustrates palette information (palette( )) according to the present invention, which is defined in the dialog_style set( ). The palette( ) provides color changing information of the text subtitle data recorded within the dialog. Herein, the palette( ) includes a plurality of palette_entries, wherein each palette_entry is described by a palette_entry_id. And, each palette_entry is provided with a specific brightness value (Y_value), a specific color value (Cr_value, Cb_value), and a specific T_value, which designates the transparency of the text data.

Accordingly, the brightness value (Y_value) is within the range of 16 to 235, the color value (Cr_value, Cb_value) is within the range of 16 to 240, and the T_value for designating the transparency is within the range of 0 to 255. More specifically, T_value=0 represents full transparency, and T_value=255 represents full opacity. However, it is preferable that the T_value is set to have a default value of '0'. Therefore, the disc manufacturer (or Author) records the palette information for each palette_entry_id within the dialog style segment (DSS), wherein the palette information is used in the entire text subtitle stream. Thus, a specific palette_entry_id may be designated and used from the above-described style information.

FIG. 10 to FIG. 13B illustrate a detailed structure of the dialog_presentation _segment( ), which represent the dialog presentation segment (DPS) according to the present invention. FIG. 10 illustrates the overall structure of the dialog_presentation_segment( ), wherein a dialog_start_PTS and a dialog_end_PTS are defined. The dialog_start_PTS and the dialog_end_PTS designate the presentation time of the corresponding dialog. Then, the dialog_presentation_segment( ) includes a palette_update_flag, which indicates a change of information within the corresponding dialog. When palette_update_flag=1b, a change (or update) of color occurs. And, the palette( ) information defining the newly changed color is recorded separately.

Subsequently, a dialog_region( ) that defines the region information is recorded in the dialog_presentation_segment( ). In the present invention, a maximum of two regions is provided within a single dialog, and therefore, dialog_region( ) information is provided to each region. The dialog_region( ) includes region_style_id information and continuous_resent_flag information. The region_style_id information designates any one of the region styles, as shown in FIG. 9B, and the continuous_present_flag information identifies whether to perform a seamless reproduction with the previous dialog region. Further, text data and region_subtitle( ) information are also included in the dialog_region( ). The text data is included in the actual corresponding region, and the region subtitle( ) information defines the local style information.

More specifically, the region_subtitle( ) consists of a text string and inline style information applied to the text string, which are formed in pairs (or groups). And, the method of recording the region_subtitle( ) according to first, second, and third embodiments of the present invention will now be described in detail with reference to FIG. 11A to FIG. 13B.

FIGS. 11A and 11B illustrate an example of recording the region_subtitle( ) according to a first embodiment of the present invention, wherein the region_subtitle( ) includes a text string and a set of identification information (type) for identifying each inline style and applied to the text string. Also, a set of 1-byte information (i.e., escape_code) is recorded between the information being identified by the identification information (type). More specifically, when recording the text string and the inline styles within the region_subtitle( ), the text string and the identification information (type) for identifying each of the inline styles are first provided. Herein, the detailed contents that are identified by the type information is identical to that of FIG. 11B.

In other words, when the type within the region_subtitle( ) is type=0x01, the type represents a beginning of the text string, and therefore, a character code is recorded in a specific field (i.e., char_data_byte) within the text_string( ). Moreover, a specific set of inline style information is included in each of type=0x02, type=0x03, type=0x04, and type=0x05. For example, type=0x02 represents a change in the Font set, and so a font ID value designated by the corresponding ClipInfo is recorded in a specific field (i.e., the inline_style_value( )), and type=0x03 represents a change in the Font style, and so a corresponding font style value is recorded in a specific field (i.e., the inline_style_value( )). Also, type=0x04 represents a change in the Font size, and a corresponding font size value is recorded in a specific field (i.e., the inline_style_value( )), and type=0x05 represents a change in the Font color, and therefore, an index value designated by the corresponding palette is recorded in a specific field (i.e., the inline_style_value( )).

Finally, type=0x0A represents a line-break in the present invention. Herein, the line-break refers to reproduction being performed by changing one line during the decoding of the text subtitle stream, instead of recording supplementary data within the corresponding type information. And, type=0x0B represents a completion (or end) of the inline style (i.e., end of inline style). The end-of-inline-style field indicate that the inline style is reset to the region presentation properties specified by the linked region style. Furthermore, prior to recording the information being identified by the identification information (or type information), an escape_code being a set of 1-byte information is inserted. The escape code immediately preceding the identification information distinguish the data representing the inline style from data preceding the escape code. Accordingly, examples of inline styles being applied to a specific text string according to the first embodiment of the present invention will now be described in detail.

First of all, a single inline style is applied to a specific text string in an order of escape_code→type (one of 0x02, 0x03, 0x04, and 0x05)+inline_style_data_byte→escape_code→type (0x01)+char_data_byte+escape_code→type (0x0B). When there is no text string having an inline style applied thereto, an identical style is applied to all text data within the region by a set of region style information. In addition, the inline style is applied until the information indicating the end of the inline style (type (0x0B)) is detected. Alternatively, at least two inline styles are applied to a specific text string in an order of escape_code→type (one of 0x02, 0x03, 0x04, and 0x05)+inline_style_data_byte→escape_code→type (one of 0x02, 0x03, 0x04, and 0x05)+inline_style_data_byte→ escape_code→type (0x01)+char_data_byte+escape_code→ type (0x0B). When at least two inline styles are applied to a single text string, the inline styles are consecutively defined and, then, the text string having the inline styles applied thereto is recorded. Therefore, the text string is not recorded between the inline styles. Furthermore, the plurality of inline styles is applied until the information indicating the end of the inline style (type (0x0B)) is detected.

FIGS. 12A and 12B illustrate an example of recording the region_subtitle( ) according to a second embodiment of the present invention, wherein the region_subtitle( ) includes a text string and a set of identification information (string_flag) for identifying each inline style and applied to the text string. The inline style is controlled by a set of number information of the inline styles (number_of_inline_style) and a set of inline style type information (inline_style_type). More specifically, in the first embodiment of the present invention, the text string, each inline style, the line-break, and the end of the inline style are all identified by a single set of identification information (type). However, in the second embodiment of the present invention, the text string and the inline styles are first identified by using a set of identification information (string_flag). Thereafter, the inline style is identified by each type by using another set of identification information (inline_style_type).

In other words, when recording the text string and the inline styles within the region_subtitle( ) according to the second embodiment of the present invention, a set of identification information (string_flag) identifying the text string and inline styles are first provided. Herein, string_flag=0b represents the inline styles, and string_flag=1b represents the text string. Therefore, when string_flag=1b, the text string is recorded, as a character code, in a specific field (i.e., char_data_byte) within the text_string( ). Additionally, when string_flag=0b, the inline styles are recorded, however, the inline styles are formed of at least one inline_style_type.

More specifically, referring to FIG. 12B, inline_style_type=0x01 represents a change in the Font set, and so a font ID value designated by the corresponding ClipInfo is recorded in a specific field (i.e., the inline_style_value( )), and inline_style_type=0x02 represents a change in the Font style, and so a corresponding font style value is recorded in a specific field (i.e., the inline_style_value( )). Also, inline_style_type=0x03 represents a change in the Font size, and a corresponding font size value is recorded in a specific field (i.e., the inline_style_value( )), and inline_style_type=0x04 represents a change in the Font color, and therefore, an index value designated by the corresponding palette is recorded in a specific field (i.e., the inline_style_value( )). Finally, inline_style_type=0x0A represents a line-break in the present invention, and inline_style_type=0x0B represents a completion (or end) of the inline style (i.e., end of inline style).

Furthermore, when string_flag=0b, the inline styles are recorded, however, a set of number_of_inline_styles information is also recorded. Herein, the number_of_inline_styles indicates the number of inline_styles included within the corresponding inline_style. As described above, a maximum of 6 inline_style_types exists in the present invention, and so, the value of the number_of_inline_styles is within the range of 1 to 6. However, apart from the above-mentioned inline_style_type, the inline_style_type may also define another inline_style_type. And, in this case, the maximum value of the number_of_inline_styles must be changed. Thus, the at least one inline_style_type included within the inline_styles is consecutively recorded as a single unit. Then, when the recording of the corresponding inline_style is completed, a set of 1-byte information (i.e., escape_code) is recorded between the information being identified by the identification information (string_flag).

FIGS. 13A and 13B illustrate an example of recording the region_subtitle( ) according to a third embodiment of the present invention, wherein the region_subtitle( ) includes a text string and a set of identification information (data_type) for identifying each inline style and applied to the text string. The inline style in controlled by an overall size value (i.e., inline_style_length) a set of 1-byte information (i.e., escape_code) is recorded between the information being identified by the identification information (data_type).

When recording the text string and the inline styles within the region_subtitle( ) according to the third embodiment of the present invention, a set of identification information (data_type) identifying the text string and inline styles are first provided. Herein, data_type=0b represents the inline styles, and data_type=1b represents the text string. Therefore, when data_type=1b, the text string is recorded, as a character code, in a specific field (i.e., char_data_byte) within the text_string( ). Additionally, when data_type=0b, the inline styles are recorded, however, the inline styles are formed of at least one inline_style_type. Accordingly, the definition of each inline_style_type according to the third embodiment of the present invention is identical to that described in the second embodiment of the present invention (shown in FIG. 12B).

Moreover, when data-type=0b, the inline styles are recorded, however, a set of inline_style_length information is also recorded. Herein, the inline_style_length indicates an overall size of the corresponding inline style. And, each of the corresponding size (length) includes an inline_style-type and an inline_style_data_byte, which records information for each type. Therefore, the at least one inline_style_type included within the inline_styles is consecutively recorded as a single unit. Then, when the recording of the corresponding inline_style is completed, a set of 1-byte information (i.e., escape_code) is recorded between the information being identified by the identification information (data_type).

Figure 14:
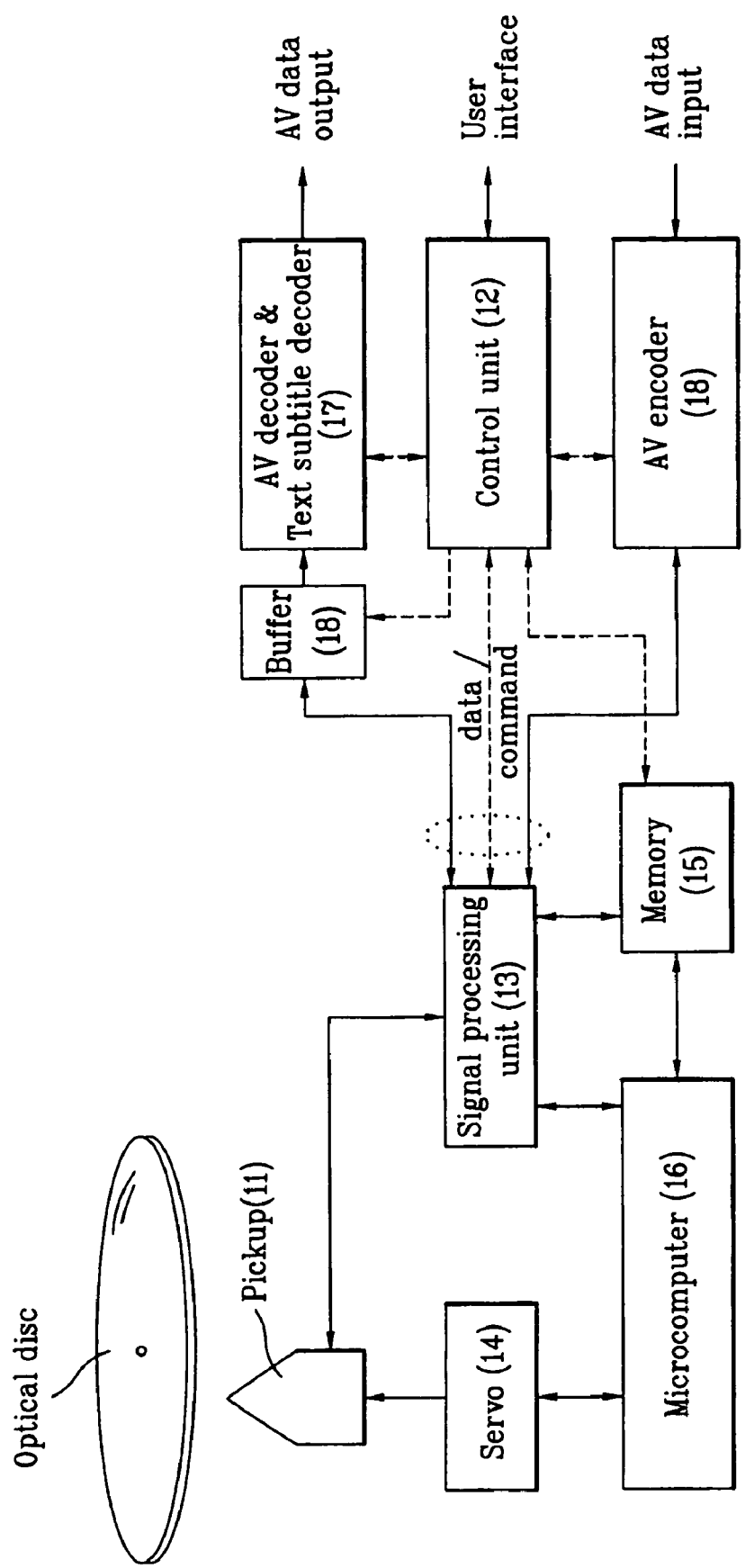
FIG. 14 illustrates an optical recording and/or reproducing apparatus including a reproduction of the text subtitle stream file according to the present invention.

FIG. 14 illustrates a detailed view of an optical recording and/or reproducing apparatus 10 according to the present invention, including the reproduction of the text subtitle data. The optical recording and/or reproducing apparatus 10 basically includes a pick-up unit 11 for reproducing main data, text subtitle stream and corresponding reproduction control information recorded on the optical disc, a servo 14 controlling the operations of the pick-up unit 11, a signal processor 13 either recovering the reproduction signal received from the pick-up unit 11 to a desired signal value, or modulating a signal to be recorded to an optical disc recordable signal and transmitting the modulated signal, and a microcomputer 16 controlling the above operations.

In addition, an AV decoder and text subtitle (Text ST) decoder 17 performs final decoding of output data depending upon the controls of the controller 12. And, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13. Accordingly, the AV decoder and text subtitle (Text ST) decoder 17 is included in the present invention as a single decoder, for simplicity of the description. However, it is apparent that only the text subtitle (Text ST) decoder can be independently included as an element of the present invention.

A buffer 18 is used for preloading and storing the text subtitle stream in advance, in order to decode the text subtitle stream according to the present invention. The controller 12 controls the operations of the optical recording and/or reproducing apparatus. And, when the user inputs command requesting a text subtitle of a specific language to be displayed. Then, the corresponding text subtitle stream is preloaded and stored in the buffer 18. Subsequently, among the text subtitle stream data that is preloaded and stored in the buffer 18, the controller 12 refers to the above-described dialog information, region information, style information, and so on, and controls the text subtitle decoder 17 so that the actual text data are displayed with a specific size and at a specific position on the screen. More specifically, the text subtitle decoder 17 decodes the dialog presentation segments (DPS) recorded in the text subtitle stream, which is preloaded within the buffer 18. However, the text subtitle stream is reproduced by using the specific region style information within the above-described dialog presentation segment (DPS), which is designated by the region_style_id recorded in the dialog presentation segment (DPS), and also by using the inline_styles applied to the specific text string recorded within the dialog presentation segment (DPS).

More specifically, among the above-described methods shown in FIG. 11A to FIG. 13B, when a set of inline_style is recorded, a set of region_styles may be applied to the corresponding text string, instead of the inline_styles. However, when reproducing a text string, wherein no inline_style is recorded, the set of region_styles is applied once again for the reproduction of the text string.

As described above, the recording medium and method and apparatus for reproducing and recording text subtitle streams have the following advantages. Text subtitle stream files may be recorded within the optical disc as standardized information, thereby enabling an efficient reproduction of the recorded text subtitle stream file.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A non-transitory computer readable recording medium storing a data structure, the data structure comprising:
   at least one text subtitle stream, each text subtitle stream including a style segment defining at least one region style and a plurality of presentation segments to which the style segment applies, the style segment being in a first packet of the text subtitle stream, the presentation segments being respectively in a plurality of packets which follow the first packet, each presentation segment containing at least one region, each region including a region style identifier and region information associated with the corresponding region, each region being linked to one of the region styles by the region style identifier,
   wherein the region information includes at least one pair of inline styles and a text string, and the inline styles are consecutively defined, and the text string is not defined between the inline styles in the pair.

2. A method of reproducing text subtitle streams, the method comprising:
   reading, by a data reproducing apparatus, at least one text subtitle stream from a recording medium, each text subtitle stream including a style segment defining at least one region style and a plurality of presentation segments to which the style segment applies, the style segment being in a first packet of the text subtitle stream, the presentation segments being respectively in a plurality of packets which follow the first packet, each presentation segment containing at least one region, each region including a region style identifier and region information associated with the corresponding region, each region being linked to one of the at least one region style by the region style identifier,
   wherein the region information includes at least one pair of inline styles and a text string, and the inline styles are consecutively defined, and the text string is not defined between the inline styles in the pair; and
   decoding, by the data reproducing apparatus, the at least one text subtitle stream based on the style segment and the region information.

3. An apparatus for reproducing text subtitle streams, the apparatus comprising:
   a pickup configured to read data from a recording medium, wherein the data includes at least one text subtitle stream, each text subtitle stream including a style segment defining at least one region style and a plurality of presentation segments to which the style segment applies, the style segment being in a first packet of the text subtitle stream, the presentation segments being respectively in a plurality of packets which follow the first packet, each presentation segment containing at least one region, each region including a region style identifier and region information associated with the corresponding region, each region being linked to one of the region styles by the region style identifier, wherein the region information includes at least one pair of inline styles and a text string, and the inline styles are consecutively defined, and the text string is not defined between the inline styles;
   a decoder configured to decode the at least one text subtitle stream from the pickup; and
   a controller operably connected with the pickup and the decoder, and configured to control the decoder to decode the at least one text subtitle stream based on the style segment and the region information.

4. An apparatus for reproducing text subtitle streams, the apparatus comprising:
   a decoder configured to decode at least one text subtitle stream, each text subtitle stream including a style segment defining at least one region style and a plurality of presentation segments to which the style segment applies, the style segment being in a first packet of the text subtitle stream, the presentation segments being respectively in a plurality of packets which follow the first packet, each presentation segment containing at least one region, each region including a region style identifier and region information associated with the corresponding region, each region being linked to one of the region styles by the region style identifier, wherein the region information includes at least one pair of inline styles and a text string, and the inline styles are consecutively defined, and the text string is not defined between the inline styles; and
   a controller operably connected with the decoder and configured to control the decoder to decode the at least one text subtitle stream based on the style segment and the region information.

5. A method of reproducing text subtitle streams, the method comprising:
   receiving, by a data reproducing apparatus, at least one text subtitle stream each text subtitle stream including a style segment defining at least one region style and a plurality of presentation segments to which the style segment applies, the style segment being in a first packet of the text subtitle stream, the presentation segments being respectively in a plurality of packets which follow the first packet, each of the presentation segments including at least one region, each region including a region style identifier and region information associated with the corresponding region, each region being linked to one of the at least one region style by the region style identifier, wherein the region information includes at least one pair of inline styles and a text string, and the inline styles are consecutively defined, and the text string is not defined between the inline styles in the pair; and decoding, by the data reproducing apparatus, the at least one text subtitle stream based on the style segment and the region information.

6. The method of claim 5, wherein the decoding step comprising:

identifying one of the at least one region style based on the region style identifier; and decoding a text subtitle within the corresponding region based on the identified region style and the region information.

* * * * *